United States Patent Office.

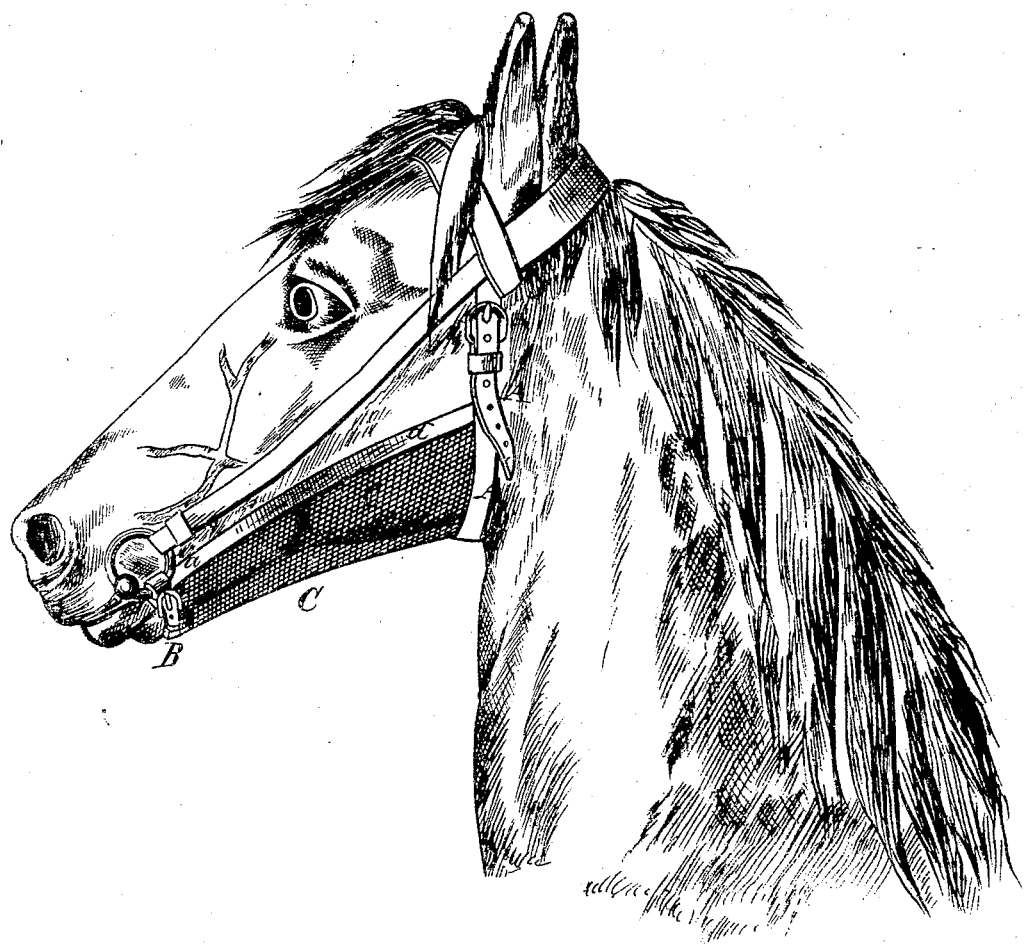

BRADLEY TREADWELL, OF READING, CONNECTICUT.

Letters Patent No. 73,851, dated January 28, 1868.

IMPROVED INSECT-GUARD FOR HORSES.

The Schedule referred to in these Letters Patent and making part of the same.

TO ALL WHOM IT MAY CONCERN:

Be it known that I, BRADLEY TREADWELL, of Reading, in the county of Fairfield, and State of Connecticut, have invented a new and improved Insect-Guard for Horses; and I do hereby declare that the following is a full, clear, and exact description thereof, which will enable others skilled in the art to make and use the same, reference being had to the accompanying drawing, forming a part of this specification.

The drawing represents a side view of my invention.

This invention relates to a new device for protecting the under sides of horses heads from the injurious and annoying effects of insects, and consists in the application of a wire-gauze or cloth guard, which is secured to the throat-latch and to the curve of the bridle, and which covers the under side of the head, keeping bees and flies from settling on the under side of the jaw.

A represents the throat-latch, and B the curve of a horse's bridle. C is a piece of wire gauze, cloth, or other suitable fabric, secured, with its ends, to the throat-latch and to the curve, so as to protect the under side of the jaw and part of the throat of a horse. The edges of the fabric may be strengthened by means of leather straps, *a a*, as shown.

Instead of being directly attached to the curve and throat-latch, the ends of the fabric C may be secured to independent straps, which can be attached to the throat-latch and curve respectively. In that case, the device may be removed from the bridle, and can be attached to the headstall-halter, for the horses to wear in the pasture.

I claim as new, and desire to secure by Letters Patent—

The insect-guard C, for horses, in combination with the bridle or halter, substantially as and for the purpose herein shown and described.

BRADLEY TREADWELL.

Witnesses:
ARTHUR B. SANFORD,
FRANCIS A. SANFORD.